United States Patent
Kelly et al.

(10) Patent No.: US 9,903,503 B2
(45) Date of Patent: Feb. 27, 2018

(54) AIRCRAFT WATER HEATING TANK AIR VENT VALVE

(71) Applicant: B/E AEROSPACE, INC., Wellington, FL (US)

(72) Inventors: Luke E. Kelly, Basehor, KS (US); Stuart A. Dietz, Topeka, KS (US)

(73) Assignee: B/E Aerospace, Inc., Wellington, FL (US)

( * ) Notice: Subject to any disclaimer, the term of this patent is extended or adjusted under 35 U.S.C. 154(b) by 53 days.

(21) Appl. No.: 14/942,498

(22) Filed: Nov. 16, 2015

(65) Prior Publication Data

US 2016/0146370 A1 May 26, 2016

Related U.S. Application Data

(60) Provisional application No. 62/085,058, filed on Nov. 26, 2014.

(51) Int. Cl.
*F16K 24/04* (2006.01)
*F16K 31/20* (2006.01)
*F16K 1/14* (2006.01)
*A47J 31/54* (2006.01)
*F16K 27/02* (2006.01)

(52) U.S. Cl.
CPC .............. *F16K 31/20* (2013.01); *A47J 31/54* (2013.01); *F16K 1/14* (2013.01); *F16K 24/046* (2013.01); *F16K 27/0245* (2013.01)

(58) Field of Classification Search
CPC ........ F16K 1/14; F16K 31/20; F16K 27/0245; F16K 24/042; F16K 24/046; A47J 31/54; Y10T 137/3099

USPC .......................................................... 137/202
See application file for complete search history.

(56) References Cited

U.S. PATENT DOCUMENTS 3,746,263 A * 7/1973 Reeder ................. A01G 25/023
137/270
3,759,281 A * 9/1973 Falcuta .................... F16K 17/40
137/433

(Continued)

FOREIGN PATENT DOCUMENTS

FR 2473671 A1 7/1981

OTHER PUBLICATIONS

International Search Report, dated Mar. 2, 2016, 4 pages, from PCT/US15/62365, published as WO2016/085949 on Jun. 2, 2016.

*Primary Examiner* — Ian Paquette
(74) *Attorney, Agent, or Firm* — Shumaker, Loop & Kendrick, LLP

(57) ABSTRACT

An aircraft water heating tank air vent valve includes an air vent valve housing having an upper vent valve body and a lower valve adapter sealingly mated together to define an interior chamber. A tubular collar is disposed within the interior chamber between an upper planar valve seat member and a lower notched valve seat member, and a ball float is movable within the tubular collar between first and second positions seated on the upper planar valve seat member or the lower notched valve seat member, respectively. The lower notched valve seat member includes oblique notches and frustoconical projections providing upper shoulders upon which the tubular collar is positioned, and providing outwardly flaring radially inner oblique edges upon which the ball float can be seated.

20 Claims, 2 Drawing Sheets

(56) References Cited

U.S. PATENT DOCUMENTS

| | | | | |
|---|---|---|---|---|
| 4,516,597 A | * | 5/1985 | Ueda | F16K 1/2265 |
| | | | | 137/314 |
| 5,435,335 A | * | 7/1995 | Klop | B67D 7/365 |
| | | | | 137/202 |
| 5,762,093 A | * | 6/1998 | Whitley, II | B60K 15/03519 |
| | | | | 137/199 |
| 7,222,636 B2 | * | 5/2007 | Nguyen | F16K 31/0655 |
| | | | | 137/15.04 |
| 8,453,673 B2 | | 6/2013 | Ford | |
| 2006/0254642 A1 | | 11/2006 | Kshirsagar et al. | |
| 2010/0132805 A1 | * | 6/2010 | Kshirsagar | F16K 24/046 |
| | | | | 137/202 |
| 2011/0301576 A1 | * | 12/2011 | Lautenbach | A61K 9/0004 |
| | | | | 604/892.1 |

* cited by examiner

AIRCRAFT WATER HEATING TANK AIR VENT VALVE

CROSS-REFERENCES TO RELATED APPLICATIONS

This application is based upon and claims priority from U.S. Provisional Application No. 62/085,058, filed Nov. 26, 2014, incorporated by reference in its entirety.

BACKGROUND

The invention generally relates to commercial and consumer products related to venting and draining of containers, and more particularly relates to venting and draining of beverage makers for aerospace applications. The invention is specifically suitable for applications that typically handle fluids and depend on a mechanical or electrical means to ensure reliable venting of air into or out of a container, such as a tank assembly in the case of a beverage maker.

Air vent valves are typically used in aircraft beverage makers in conjunction with filling and draining a fresh water tank assembly, but in the past such air vent valves frequently have not been as reliable as desired to meet stringent quality standards. While a number of variations of air vent valve systems currently exist, they are all primarily of the float type. In these devices, a plastic or metal float is pushed up by liquid filling a tank to shut a vent hole during a filling operation, and conversely the float drops away from the vent hole to open up the vent during drainage of the liquid from the tank. These floats are susceptible to wear and tear (typically pitting due to mechanical pounding particularly compounded by chattering and cracking) which then results in a leak, because the body surface of the float is no longer smooth enough to seat properly against the vent hole.

Floats may also not be able to seal properly due to wear and tear of the seat against which the float seals, because of high impact to the valve seat after some usage, from a variety of factors. This causes leaks which, depending on the galley configuration, can be sufficient to cause a wet carpet condition in the aircraft, which is clearly not desirable. Also, a float can at times become stuck in a seated position in an air vent valve, which prevents drainage of liquid from the beverage maker, resulting in an inoperative condition. A common complaint from the customers is that such beverage makers for aerospace application become inoperative due to failure of an air vent valve, since having a beverage maker out of service due to a relatively inexpensive component is very expensive for an airline. Another major disadvantage of some conventional air vent valves is that the valves can vibrate or chatter in an audible manner in the operating pressure range of the tank on an aircraft. This chatter is not only annoying, but is usually also sufficiently prolonged to cause continuous leaks during that time. The chattering and vibration shortens useful life of the vent valve, lowering customer satisfaction and causing higher warranty costs.

One prior known design for an aircraft air vent valve for a water reservoir includes a vent valve body having a vent outlet and a valve adapter having a fluid inlet that sealingly mate together to form a common interior flow chamber including a tubular collar, a spherical ball float constrained for longitudinal movement within the tubular collar, and a planar valve seat member with a central flow aperture is disposed within the vent valve body between the tubular collar and the outflow passage of the vent valve body. However, it has been found that such an air vent valve typically can cause a malfunction as the water reservoir reaches full capacity, by allowing the ball float to initially bounce off the planar valve seat member, which allows water to escape past the ball float and out the vent outlet. The initial bounce of the ball float typically also creates an oscillation of the ball float that can last indefinitely, allowing water to forcefully flow from the valve vent outlet, and resulting in repeated impact of the ball float with the valve adapter. In time, this indefinite oscillation of the ball float can result in fracturing the surface of the ball float, and an inability of the ball float to seal against the planar valve seat member. During the malfunction, water typically escapes at a faster rate than a normal drain can accommodate, allowing water to overflow onto the aircraft galley carpet, and wasting the limited amount of potable water available on the aircraft.

It would therefore be desirable to provide an aircraft water heating tank air vent valve that reduces the likelihood of such a malfunction and allows the vent ball to overcome such a malfunction event by changing the flow dynamics of the valve, so that the ball float can quickly be seated, by dampening the potential energy of rebounding of the ball float during any such oscillation that may occur, to quickly stop such oscillation, to minimize flow of water from the vent outlet, to allow the valve to function as intended, and to minimize possible damage to the ball float. The present invention meets these and other needs.

SUMMARY OF THE INVENTION

Briefly, and in general terms, the present invention provides for an air vent valve assembly for a tank assembly of a beverage maker for aircraft, including an improved valve seat member disposed within an interior chamber of the air vent valve assembly, to reduce the likelihood and severity of malfunctioning of the air vent valve assembly.

Accordingly, the present invention provides for an air vent valve assembly for a tank assembly of a beverage maker for aircraft, including an air vent valve housing including an upper vent valve body and a lower valve adapter sealingly mated with the vent valve body that together defining an interior chamber within the air vent valve housing, with an outlet flow passage in the upper vent valve body, the lower valve adapter being configured to be attached to the tank assembly of the beverage maker, and a flow inlet in the lower valve adapter. An upper planar valve seat member preferably is disposed within the interior chamber adjacent to the outflow passage, a lower notched valve seat member preferably is disposed within the interior chamber of the vent valve body adjacent to the flow inlet, and a tubular collar preferably is disposed within the interior chamber between the upper planar valve seat member and the lower notched valve seat member. A ball float within the tubular collar is movable between a first position seated on the upper planar valve seat member and a second position seated on the lower notched valve seat member and spaced apart from and opening the central aperture of the upper planer valve seat member.

In a presently preferred aspect, the lower notched valve seat member has a surface defining a plurality of oblique notches in fluid communication between the central flow aperture and the interior chamber of the air vent valve housing, and a plurality of frustoconical projections each including an upper shoulder, each of the plurality of frustoconical projections defining an outwardly flaring radially inner oblique edge. In another presently preferred aspect, the ball float is positioned within the tubular collar so as to be seated on the outwardly flaring radially inner oblique edges of the plurality of frustoconical projections of the lower notched valve seat member in the second position. In another presently preferred aspect, the tubular collar is configured to be seated on the upper shoulders of the plurality of frustoconical projections.

In another currently preferred aspect, the upper vent valve body includes an outer annular flange with an externally threaded surface, and the lower valve adapter includes an upper annular flange with an internally threaded surface that mates with the externally threaded surface of the upper vent valve body. In another presently preferred aspect, an outlet vent fitting is attached to the outlet flow passage to allow for exchange of outside air through the vent valve assembly.

In another presently preferred aspect, the lower notched valve seat member and the tubular collar are made of a corrosion resistant material, such as polytetrafluoroethylene, for example. In another presently preferred aspect, the ball float is made of plastic, such as polymethylpentene, for example, although other similar plastic materials may be suitable, and the upper planar valve seat member is made of a soft, resilient elastomeric material, which may be a thermoplastic fluoropolymer, such as polyvinylidene difluoride, or which may be silicone, for example.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

While prior aircraft air vent valves for an aircraft water reservoir can malfunction by allowing a ball float to oscillate indefinitely, allowing water to flow from the valve vent outlet, and damaging the ball float, the present invention provides for an aircraft water heating tank air vent valve that reduces the likelihood of such a malfunction and allows the vent ball to overcome such a malfunction, to minimize water loss, and to minimize damage to the ball float.

Figure 1:
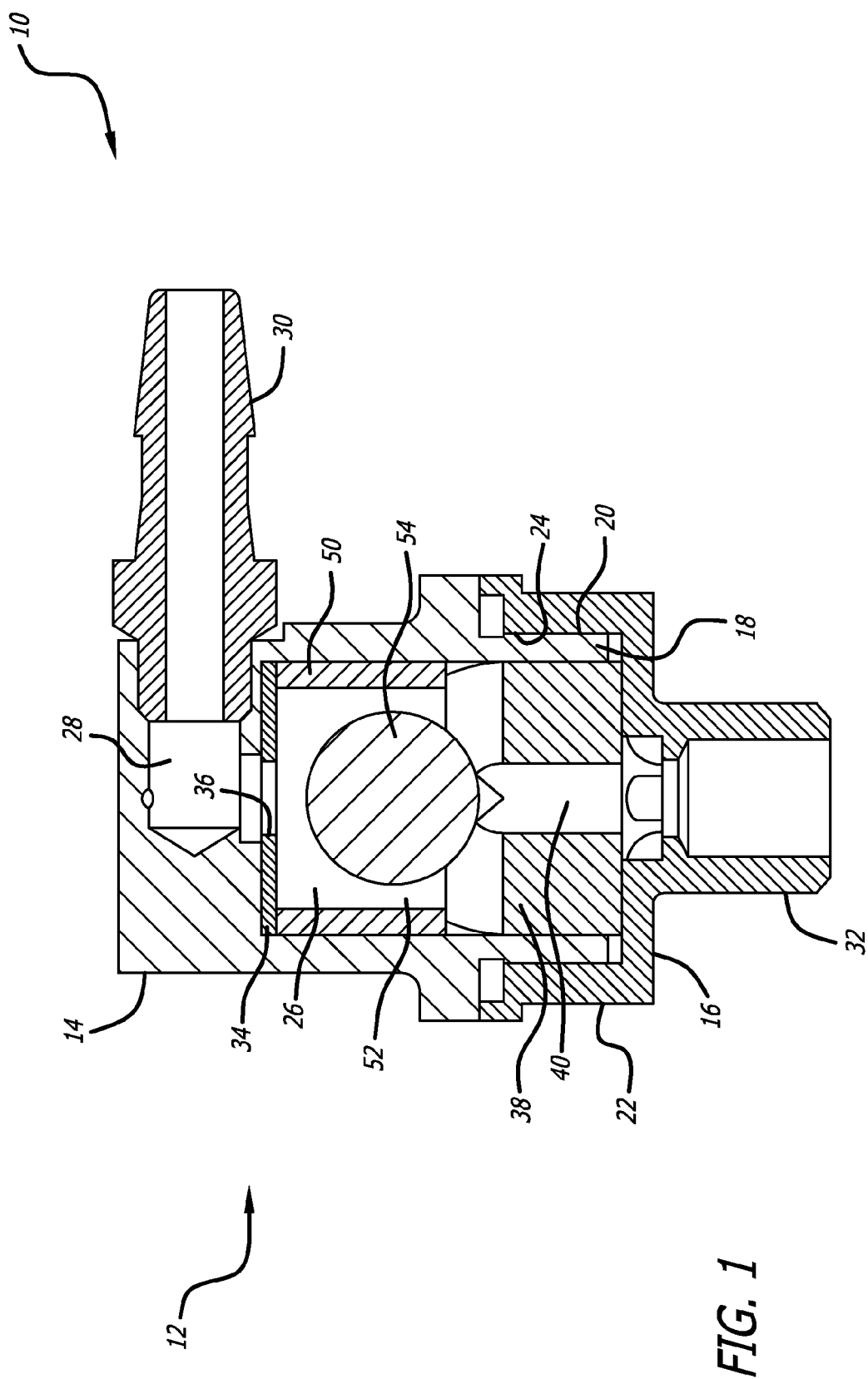
FIG. 1 is a cross-sectional view of the air vent valve assembly according to the present invention.
Figure 2:
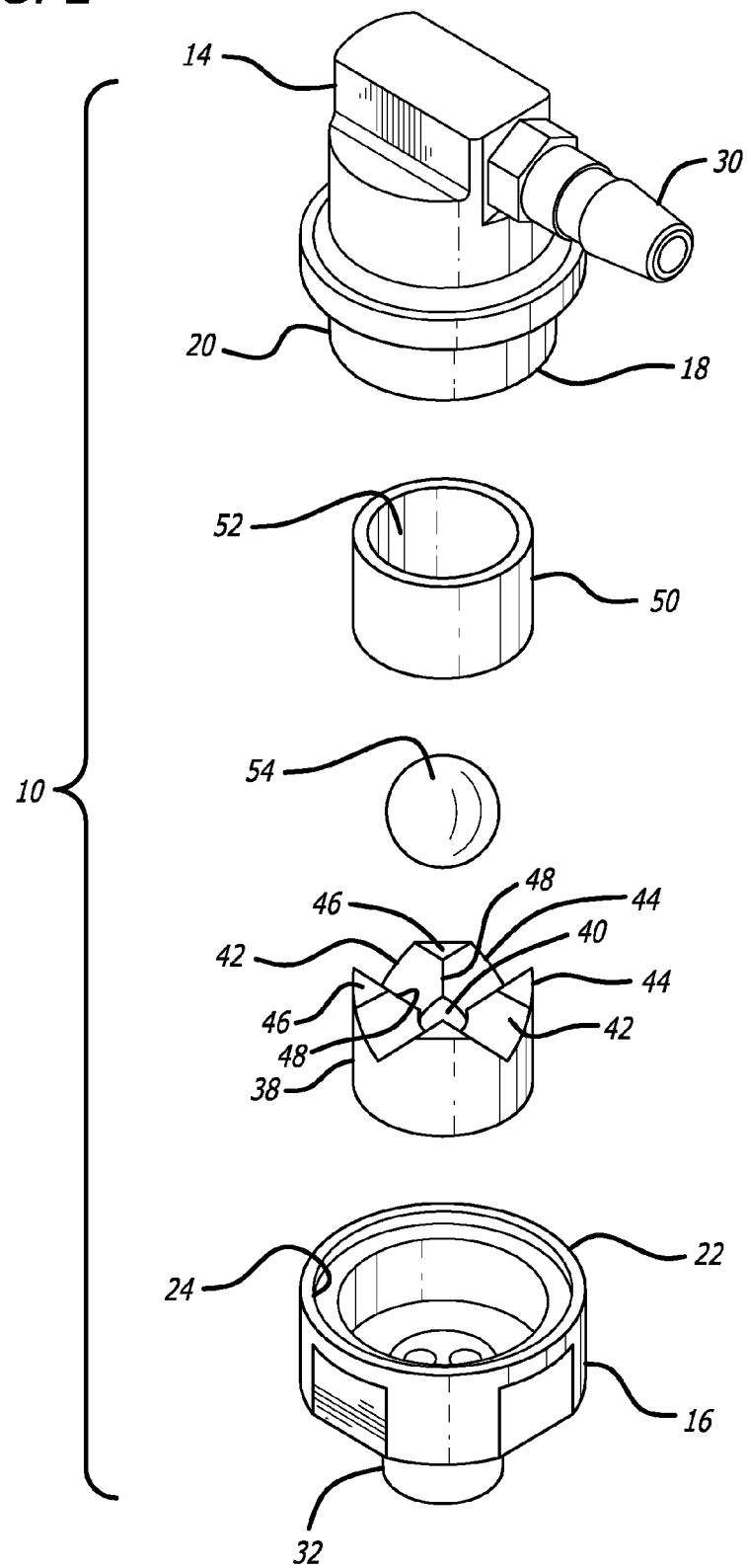
FIG. 2 is an exploded view of the air vent valve assembly of FIG. 1.

Accordingly, referring to FIGS. 1 and 2, the present invention provides for an air vent valve assembly 10 for a tank assembly of a beverage maker for aircraft, including an air vent valve housing 12, typically made of stainless steel, including an upper vent valve body with cylindrical walls 14 and a lower valve adapter 16 sealingly mated with the vent valve body. The upper vent valve body includes an annular or cylindrical flange 18 extending from the cylindrical walls of the upper vent valve body, with the upper vent valve annular flange preferably including an externally threaded surface 20. The lower valve adapter includes an annular or cylindrical flange 22, preferably including an internally threaded surface 24 that mates with the externally threaded surface of the annular or cylindrical flange of the upper vent valve body. The upper vent valve body, upper vent valve body cylindrical walls, upper vent valve body annular or cylindrical flange, and the lower valve adapter and lower valve adapter annular or cylindrical flange thus together define an interior chamber 26 within the air vent valve housing.

The upper vent valve body includes an outlet flow passage 28 connected in fluid communication with the interior chamber of the air vent valve housing, and an outlet vent fitting 30 attached to the outlet flow passage to allow for exchange of outside air through the vent valve assembly. The lower valve adapter preferably is configured to be attached to a tank assembly of a beverage maker, and includes a flow inlet 32 connected in fluid communication with the interior chamber of the air vent valve housing.

An upper planar valve seat member or washer 34 is disposed within the interior chamber of the vent valve body adjacent to the outflow passage of the vent valve body, and the upper planar valve seat member preferably has a surface defining a central flow aperture 36 in fluid communication between the outflow passage of the vent valve body and the interior chamber of the air vent valve housing.

The upper planar valve seat member preferably is made of a soft, resilient elastomeric material, such as polyvinylidene difluoride (PVDF) or other similar suitable thermoplastic fluoropolymers, or silicone, for example, to provide the upper planar valve seat member with a sufficiently smooth finish to accomplish a leak-free seal by the float against the vent outlet opening in the internal chamber of the vent valve body. In a presently preferred aspect, the central flow aperture of the upper planar valve seat member of the vent valve assembly and the outlet flow passage are optimized to allow the flow of air at sufficient rates to disallow instability. In one currently preferred embodiment, the inside diameter of the central flow aperture of the upper planar valve seat member is approximately 0.125 inch, and the inside diameter of the outlet vent fitting is approximately 0.121 inch.

Advantageously, a lower notched valve seat member 38 is also disposed within the interior chamber of the vent valve body adjacent to the flow inlet of the lower valve adapter. The lower notched valve seat member includes a central flow aperture 40 in fluid communication between the flow inlet of the lower valve adapter and the interior chamber of the air vent valve housing. The lower notched valve seat member preferably has a surface defining a plurality of oblique notches 42 in fluid communication between the central flow aperture and the interior chamber of the air vent valve housing, and a plurality of frustoconical projections 44, each including an upper planar shoulder 46, and each of the plurality of frustoconical projections includes an outwardly flaring radially inner oblique edge 48. As shown in FIG. 1, the upper outer sides of the plurality of frustoconical projections may optionally taper inwardly at the upper planar shoulders to facilitate assembly of the upper vent valve body and the lower valve adapter. The lower notched valve seat member is preferably formed of polytetrafluoroethylene (PTFE).

A tubular collar 50 having an interior lumen 52 is preferably disposed within the interior chamber of the vent valve body between the upper planar valve seat member and the lower notched valve seat member, and is preferably configured to be seated on the upper planar shoulders of the plurality of frustoconical projections of the lower notched valve seat member. The tubular collar preferably also is made of a corrosion resistant material, such as polytetrafluoroethylene (PTFE).

A ball float 54 is also movably disposed within the lumen of the tubular collar, and is preferably movable longitudinally between a first or upper position and a second or lower position within the lumen of the tubular collar, and within a volume in the interior chamber bounded by the upper planar valve seat member, the tubular collar, and the lower notched valve seat member. The ball float preferably is spherical, and preferably is made of plastic, such as polymethylpentene (PMP), available from Mitsui Chemicals America, Inc., of Rye Brook, N.Y., under the brand name TPX, which is a material that does not become distorted at temperatures above 180° F. When the ball float is seated on the upper planar valve seat member in the first or upper position within the tubular collar, the ball float abuts and closes the central flow aperture of the upper planar valve seat member. The ball float typically rests on the lower notched valve seat member spaced apart from and opening the central aperture of the upper planer valve seat member in the second or lower position, and preferably in the second position the ball float is positioned within the tubular collar so as to be seated on the outwardly flaring radially inner oblique edges of the plurality of frustoconical projections of the lower notched valve seat member, at the bottom of the tubular collar.

It should be apparent to those skilled in the art that the vent valve body alternatively can be provided with internal threads instead of external threads, and the valve adapter may be provided with corresponding external threads. Accordingly, it will be apparent from the foregoing that while particular forms of the invention have been illustrated and described, various modifications can be made without departing from the spirit and scope of the invention, and it is not intended that the invention be limited, except as by the appended claims.

The invention claimed is:

1. An air vent valve assembly comprising:
   an air vent valve housing comprising
      an interior chamber within said air vent valve housing,
      an outlet flow passage connected in fluid communication with said interior chamber of said air vent valve housing, and
      a lower valve adapter configured to be attached to a tank assembly of a beverage maker, said lower valve adapter having a flow inlet connected in fluid communication with the interior chamber of said air vent valve housing;
   an upper valve seat member disposed within the interior chamber of the air vent valve housing adjacent to said outlet flow passage of the air vent valve housing, the upper valve seat member having a surface defining a central flow aperture in fluid communication between said outlet flow passage of the air vent valve housing and said interior chamber of said air vent valve housing;
   a lower valve seat member disposed within the interior chamber of the air vent valve housing adjacent to said flow inlet of said lower valve adapter, said lower valve seat member including a central flow aperture in fluid communication between said flow inlet of said lower valve adapter and said interior chamber of said air vent valve housing, said lower valve seat member having a surface defining a plurality of frustoconical projections each including an upper shoulder;
   a tubular collar having a lumen disposed within the interior chamber of the air vent valve housing between said upper valve seat member and said lower valve seat member, said tubular collar being configured to be seated on said upper shoulders of said plurality of frustoconical projections; and
   a ball float movably disposed within the lumen of the tubular collar, the ball float being movable between a first position and a second position, said ball float being positioned within said tubular collar so as to be seated on said upper valve seat member in said first position, abutting and closing the central flow aperture of the upper valve seat member in said first position, and said ball float being seated on said lower valve seat member and spaced apart from and opening said central aperture of said upper valve seat member in said second position.

2. The air vent valve assembly of claim 1, wherein said air vent valve housing includes an annular flange with an externally threaded surface, and said lower valve adapter includes an annular flange with an internally threaded surface that mates with the externally threaded surface of said annular flange of the air vent valve housing.

3. The air vent valve assembly of claim 1, further comprising an outlet vent fitting attached to the outlet flow passage to allow for exchange of outside air through the air vent valve assembly.

4. The air vent valve assembly of claim 1, wherein said upper valve seat member is made of a soft, resilient elastomeric material.

5. The air vent valve assembly of claim 1, wherein said upper valve seat member is made of thermoplastic fluoropolymer.

6. The air vent valve assembly of claim 1, wherein said upper valve seat member is made of polyvinylidene difluoride.

7. The air vent valve assembly of claim 1, wherein said upper valve seat member is made of silicone.

8. The air vent valve assembly of claim 1, wherein said lower valve seat member is formed of polytetrafluoroethylene.

9. The air vent valve assembly of claim 1, wherein said tubular collar is made of a corrosion resistant material.

10. The air vent valve assembly of claim 1, wherein said tubular collar is made of polytetrafluoroethylene.

11. The air vent valve assembly of claim 1, wherein said ball float is made of plastic.

12. The air vent valve assembly of claim 1, wherein said ball float is made of polymethylpentene.

13. The air vent valve assembly of claim 1, wherein the surface of said lower valve seat member defines a plurality of oblique notches in fluid communication between said central flow aperture and said interior chamber of said air vent valve housing, each of said plurality of frustoconical projections defining an outwardly flaring radially inner oblique edge.

14. The air vent valve assembly of claim 13, wherein said ball float is positioned within said tubular collar so as to be seated on said outwardly flaring radially inner oblique edges of said plurality of frustoconical projections of said lower valve seat member in said second position.

15. The air vent valve assembly of claim 1, wherein said lower valve seat member has a plurality of oblique notches defined between adjacent ones of said plurality of frustoconical projections, respectively.

16. The air vent valve assembly of claim 15, wherein said plurality of oblique notches are in fluid communication between said central flow aperture and said interior chamber of said air vent valve housing.

17. An air vent valve assembly comprising:
   an air vent valve housing comprising
      an interior chamber within said air vent valve housing,
      an outlet flow passage connected in fluid communication with said interior chamber of said air vent valve housing, and
      a lower valve adapter configured to be attached to a tank assembly of a beverage maker, said lower valve adapter having a flow inlet connected in fluid communication with the interior chamber of said air vent valve housing;

an upper valve seat member disposed within the interior chamber of the air vent valve housing adjacent to said outlet flow passage of the air vent valve housing, the upper valve seat member having a surface defining a central flow aperture in fluid communication between said outlet flow passage of the air vent valve housing and said interior chamber of said air vent valve housing;

a lower notched valve seat member disposed within the interior chamber of the air vent valve housing adjacent to said flow inlet of said lower valve adapter, said lower notched valve seat member including a central flow aperture in fluid communication between said flow inlet of said lower valve adapter and said interior chamber of said air vent valve housing, said lower notched valve seat member having a surface defining a plurality of frustoconical projections and a plurality of oblique notches defined between adjacent ones of said plurality of frustoconical projections, respectively, said plurality of oblique notches being in fluid communication between said central flow aperture and said interior chamber of said air vent valve housing, said plurality of frustoconical projections each including an upper shoulder;

a tubular collar having a lumen disposed within the interior chamber of the air vent valve housing between said upper valve seat member and said lower notched valve seat member, said tubular collar being configured to be seated on said upper shoulders of said plurality of frustoconical projections; and a ball float movably disposed within the lumen of the tubular collar, the ball float being movable between a first position and a second position, said ball float being positioned within said tubular collar so as to be seated on said upper valve seat member in said first position, abutting and closing the central flow aperture of the upper valve seat member in said first position, and said ball float being seated on said lower notched valve seat member and spaced apart from and opening said central aperture of said upper valve seat member in said second position.

18. The air vent valve assembly of claim 17, wherein said air vent valve housing includes an annular flange with an externally threaded surface, and said lower valve adapter includes an annular flange with an internally threaded surface that mates with the externally threaded surface of the annular flange of said air vent valve housing.

19. The air vent valve assembly of claim 17, further comprising an outlet vent fitting attached to the outlet flow passage to allow for exchange of outside air through the air vent valve assembly.

20. The air vent valve assembly of claim 17, wherein each of said plurality of frustoconical projections defines an outwardly flaring radially inner oblique edge, and said ball float is positioned within said tubular collar so as to be seated on said outwardly flaring radially inner oblique edges of said plurality of frustoconical projections of said lower notched valve seat member in said second position.

* * * * *